Dec. 8, 1959    V. T. MANAS    2,916,310
BRANCHED VERTICAL SOIL PIPE LINE FITTING WITH VENT
Filed Jan. 29, 1957    3 Sheets-Sheet 1

INVENTOR.
VINCENT T. MANAS
BY
Golrick & Golrick
ATTORNEYS

Dec. 8, 1959 V. T. MANAS 2,916,310
BRANCHED VERTICAL SOIL PIPE LINE FITTING WITH VENT
Filed Jan. 29, 1957 3 Sheets-Sheet 2

INVENTOR.
VINCENT T. MANAS
BY
Gohrick & Gohrick
ATTORNEYS

United States Patent Office 2,916,310
Patented Dec. 8, 1959

2,916,310

BRANCHED VERTICAL SOIL PIPE LINE FITTING WITH VENT

Vincent Thomas Manas, Washington, D.C., assignor to Josam Manufacturing Co., Michigan City, Ind., a corporation of Delaware Application January 29, 1957, Serial No. 637,012

1 Claim. (Cl. 285—153)

The present invention contemplates the provision of a special fitting which will afford substantially horizontal and vertical soil pipe connections while affording a vertically adjustable connection of a toilet bowl fixture to the special fitting whereby a battery of toilet bowl fixtures connected to the so-called horizontal line may be set in a common horizontal plane above the floor while one of the fixtures in the battery is connected to the vertical soil pipe line. The fixture connection is so devised that the connection of this separate fixture can be adjusted vertically into horizontal alignment with the other fixtures regardless of vertical variations in the joint connections of the sections of the vertical line, i.e. the special fitting is such that rough-in variations of the vertical line is permissible.

The special fitting is in the form of a TY construction with passageways so arranged that a single vent branch can be used to vent the horizontal lines to be connected to the fitting thus effecting a considerable saving in labor and materials particularly where loop venting installation is specified.

In my co-pending application Serial No. 688,735, I have disclosed a special fitting adaptable to an inclined horizontal drain line wherein a vertically adjustable connecting plate, not part of a carrier structure, is used to connect the bowl fixture discharge line to the inclined horizontal soil pipe line. In the present instance I so construct the special fitting that a like plate may be used to connect the fixture discharge line to the special fitting and vertical line and the special fitting has a branch or back to back branches offset with relation to a vertical stack section or reach which may have top and bottom threaded or spigot and hub connections to the vertical soil line. The vertical adjustability of the plate on the fitting permits of variation in the vertical connections of the down stack, a desirable feature since the location of the Y branch vertically will be dependent somewhat upon the total number of fixtures to be served by the horizontal soil line.

Figure 1:
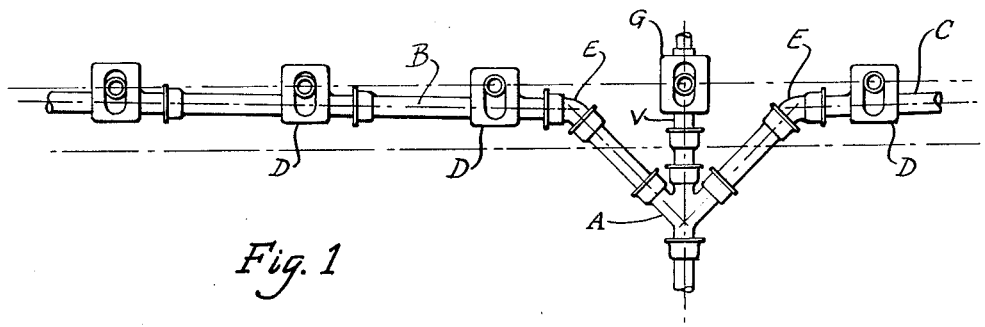
Fig. 1 is a diagrammatic illustration of the present practice of connecting a special fitting into a vertical soil pipe line which drains substantially horizontal soil pipe lines.

In Fig. 1 of the drawings I show more or less diagrammatically the practice followed heretofore of using a Y connection A located beneath the floor level to which are connected the inclined substantially horizontal soil lines B and C which serve a battery of toilet bowl fixtures afforded by special fittings D. In this practice, in addition to the Y fitting A are 45° elbows E, pipe sections F and special fitting G connected into the vertical stack or line V.

Figure 2:
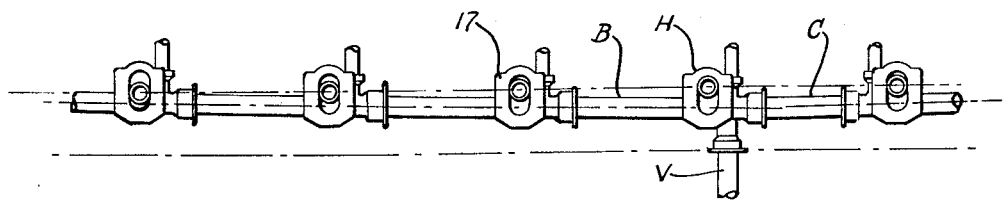
Fig. 2 illustrates diagrammatically the advantages of multiple fixture installation when using my special fitting.
Figure 3:
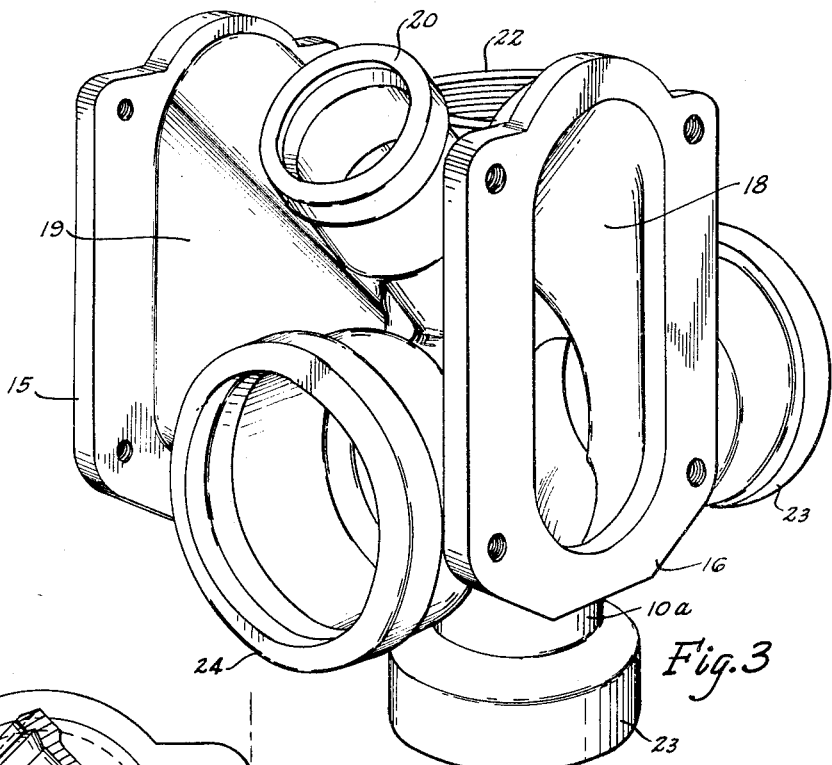
Fig. 3 is a perspective of the fitting per se.

In Fig. 2 I show my special fitting H connected directly to the inclined soil lines B and C above the floor level and also connected into the vertical soil line V whereby I eliminate the 45° drop of the horizontal soil line connections to the vertical line below the floor and thereby eliminate several sections and fittings and their connections. Since these soil lines are four to five inches in diameter the savings in labor and material are considerable.

Figure 4:
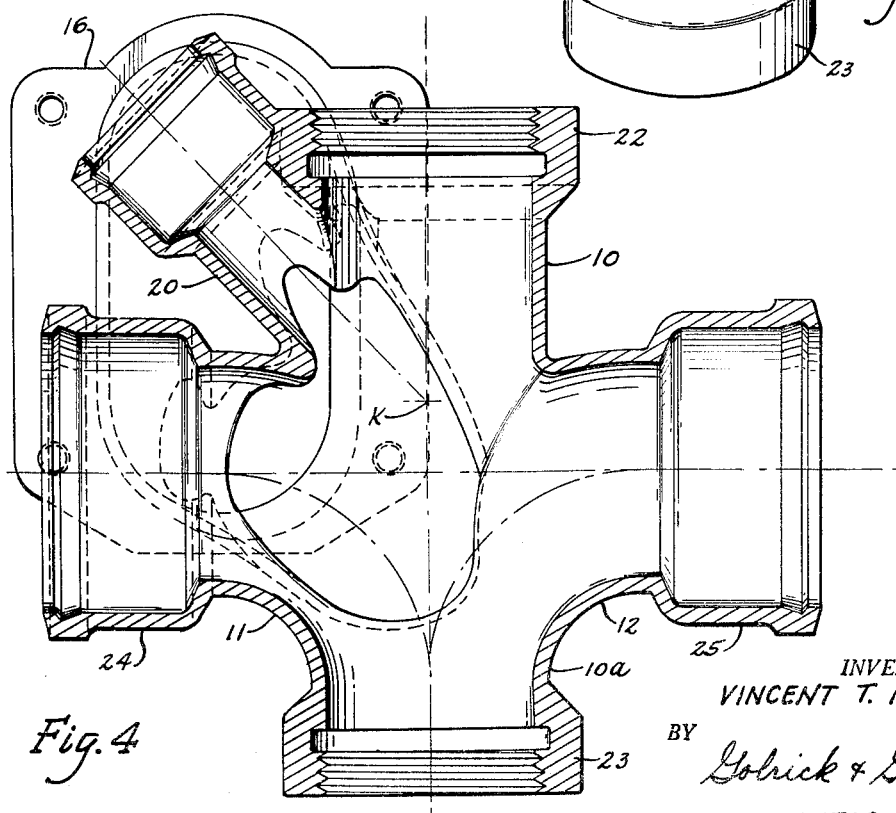
Fig. 4 is a cross sectional view of the fitting taken centrally of the fitting.

In Fig. 4 I show a vertical section or reach 10 of my special fitting adapted to be assembled into the vertically disposed soil pipe line or stack V. Integrally formed with the section 10 are Y branches 11 and 12 of 90° elbow formation communicating with the vertical section 10 disposed toward the lower portion 10a of the vertical reach or section of the fitting. Back to back branch connecting plates or flanges 15 and 16 are spaced in offset relation to the stack reach 10 and have vertically extending elongated openings 18. These plates or flanges 15—16 are integrally formed with the fitting and extend from below the center of the Y branch to above the top end of the stack section 10. The elongated openings are disposed in a plane displaced 90° from the vertical plane of the center lines of the Y branches 11 and 12. The elongated openings communicate with the stack section through converging vertically elongated branch structures 19 which extend downwardly through 90° to connect into the vertical section and the Y branch 11. The bottoms of these branches 19 terminate below the center line of the Y branches 11 and 12 so that the waste waters discharging through branches 19 are directed downwardly in the vertical soil line section 10a.

Disposed between the branches 19 and vertical section 10 and extending upwardly and disposed 45° to the Y branch 11 and vertical stack section 10 is a venting branch 20 which is in communication with the Y formation 11, the vertical stack section and branches 19, the connection being such that the vent opening is disposed out of the path of waste water flow in the Y branches, the connecting branches 19 and the vertical stack section. The vent branch affords connection of the interior of the special fitting through loop venting or direct venting as may be specified. This positioning of the vent branch is obtained by having the center line of the vent branch intersect the vertical center line of the stack section at K located above the intersection of the horizontal center line of the Y branch 11 with the center line of the stack section.

The stack section may be provided with upper and lower threaded hubs 22 and 23 respectively or these hubs may be of a spigot and hub connection type and likewise the Y branches may be provided with spigot and hub connections 24 and 25.

Referring to Fig. 2 it will be noted that my special fitting H is located in the soil pipe down stack V above the floor structure whereby the inclined horizontal lines B and C may be connected readily to the Y branches 11 and 12 of the fitting.

The horizontal soil lines have an inclination of about ¼ inch between fittings and the special fittings have elongated vertically extending openings permitting of a vertical adjustment of the fixture discharge line connecting plate 17 of about 4¼ inches thus permitting of the inclusion of a large battery of bowl fixtures all connected to a drainage line of the required drainage inclination. The special fitting H having the Y connection construction described thus permits of the use of two batteries of fixtures, one on each side of the vertical line V and the special fitting by reason of the elongated vertically extending openings 18 in the outer termini of the flanges 15—16 permits of the locating of bowl fixtures at the vertical soil line location so that the battery of fixtures may be arranged continuously in a uniformly leveled and spaced manner while all connections are above the floor level. Also the special fitting may be used to connect the vertical line to the horizontal inclined line when the vertical stack is to the right or left end of the horizontal line.

Figure 5:
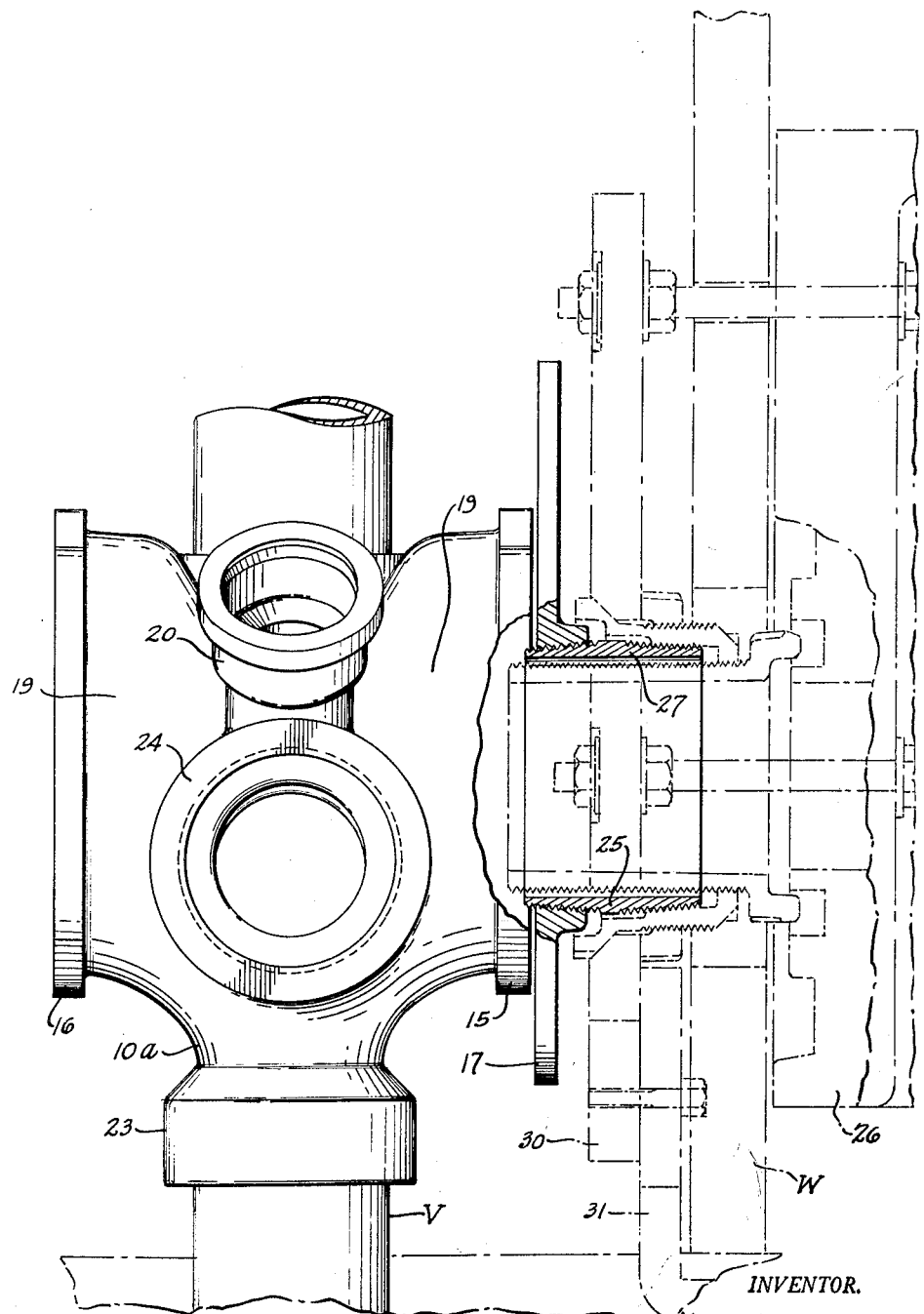
Fig. 5 is a vertical view of the fitting showing its proximation to a carrier and fixture allowing vertical adjustment of the carrier relative to the fitting.

In Fig. 5 I show the special fitting H in relation to the horn of a bowl fixture 26. The connection comprises a pipe branch or nipple 27 in threaded connection with the vertically adjustable plate 17 which is bolted to the flange 15 of the special fitting so that the branch pipe 27 and plate 17 may be adjusted vertically to level the fixture 26 with the other fixtures in the battery. In the form of coupling shown the carrier or chair 39 is centered on the branch pipe 27 and an adjustable foot structure 31 is embedded in the final floor structure.

To those skilled in the art it will be understood that the special fitting H may be used where batteries of fixtures are not arranged in back to back relation and that a branch or branches may be provided on the vertical section 10 of the fitting for the connection of wash bowl waste lines to the fitting and vertical drain line.

While the soil lines B and C have been referred to herein, as horizontal, it is to be understood that these lines are not disposed horizontally but are inclined to conform with various plumbing code requirements such for instance as a drop of not less than ¼ inch from one fixture connection to the next or adjacent fixture connection. When only a few fixtures are in the battery a greater inclination or drop in the horizontal line is permissible.

I claim:

A combined horizontal-vertical soil pipe line fitting comprising a single integral member consisting of a cylindrical vertical section adaptable to connection in a roughed-in vertical soil pipe line, opposite branches extending horizontally of the vertical section and formed with the lower wall portions thereof curving downwardly and connected to the lower portion of the vertical section providing inner rounded corners at the junction, opposite toilet bowl connection branches extending generally at a right angle to the horizontal branch and the vertical section and downwardly and inwardly and terminating below the centerline of the horizontal branches, said toilet bowl connection branches having vertically elongated entrance openings flanged to provide opposite bowl connections within the range of variation of the roughed-in horizontal and vertical soil pipe lines to which the fitting is adapted to be connected, said bowl branch openings and flanges thereof extending from above the entrant opening of the vertical section downwardly to a horizontal plane within the lower half of the horizontal branches, and an upwardly extending vent branch integrally formed with its centerline disposed in a vertical plane common to the center lines of the horizontal and vertical branches.

References Cited in the file of this patent

UNITED STATES PATENTS

| | | |
|---|---|---|
| Re. 12,741 | Morton | Jan. 21, 1908 |
| 788,803 | Walker | May 2, 1905 |
| 1,097,982 | Luff | May 26, 1914 |
| 1,410,526 | Bennett | Mar. 21, 1922 |
| 1,486,475 | Birney | Mar. 11, 1924 |
| 2,379,669 | Warren | July 3, 1945 |
| 2,686,321 | Schmid | Aug. 17, 1954 |
| 2,795,798 | Boggess et al. | June 18, 1957 |